United States Patent
Zettlitzer et al.

(10) Patent No.: US 10,724,665 B2
(45) Date of Patent: Jul. 28, 2020

(54) CONNECTOR FOR A FLUID CONDUCTION SYSTEM AND A FLUID CONDUCTION SYSTEM WITH A CORRESPONDING CONNECTOR

(71) Applicant: ECOLAB USA INC., St. Paul, MN (US)

(72) Inventors: Guenter Zettlitzer, Bergen (DE); Rudolf Albrecht, Bad Aibling (DE)

(73) Assignee: Ecolab USA Inc., Saint Paul, MN (US)

( * ) Notice: Subject to any disclaimer, the term of this patent is extended or adjusted under 35 U.S.C. 154(b) by 8 days.

(21) Appl. No.: 16/067,415

(22) PCT Filed: Dec. 29, 2015

(86) PCT No.: PCT/EP2015/081351
§ 371 (c)(1),
(2) Date: Jun. 29, 2018

(87) PCT Pub. No.: WO2017/114563
PCT Pub. Date: Jul. 6, 2017

(65) Prior Publication Data
US 2019/0011069 A1    Jan. 10, 2019

(51) Int. Cl.
*F16L 37/252* (2006.01)
*F16L 37/30* (2006.01)

(52) U.S. Cl.
CPC ............. *F16L 37/252* (2013.01); *F16L 37/30* (2013.01)

(58) Field of Classification Search
CPC .......... F16L 37/28; F16L 37/30; F16L 37/252
(Continued)

(56) References Cited

U.S. PATENT DOCUMENTS

| 5,368,069 A | * | 11/1994 | Felber | ................... | F16K 15/038 |
| | | | | | 137/512.1 |
| 5,937,885 A | | 8/1999 | Sampson | | |
| 7,677,261 B1 | * | 3/2010 | Smith et al. | ............ | F16L 37/28 |
| | | | | | 137/1 |

FOREIGN PATENT DOCUMENTS

| CN | 2077511 U | 5/1991 |
| CN | 2245700 V | 1/1997 |

(Continued)

OTHER PUBLICATIONS

International Patent Application No. PCT/EP2015/081351, International Search Report and Written Opinion dated Aug. 30, 2016, 8 pages.

*Primary Examiner* — Kevin L Lee
(74) *Attorney, Agent, or Firm* — Fredrikson & Byron, P.A.

(57) ABSTRACT

The invention relates to a connector (10) for a fluid conduction system comprising: —a female coupling part (12); —a male coupling part (14) for inserting into the female coupling part (12) along a longitudinal axis (16) of the connector (10); and —controlling means for locking/unlocking the inserted male coupling part (12) within the female coupling part (14) and for controlling the fluidic coupling of the two coupling parts (12, 14) by rotating said two coupling parts (12, 14) against one another about the longitudinal axis (16); wherein a portion of each of the coupling parts (12, 14) is realized as a shut-off valve (18, 24) with a valve body (20, 26) and a rotatable slider element (22, 28), wherein the rotatable slider element (22, 28) of each shut-off valve (18, 24) is in a compulsory closed position when the two coupling parts (12, 14) are unlocked; and wherein the rotatable slider element (22, 28) of each shut-off valve (18, 24) is transferable between the closed position and an open position only if the two coupling parts (12, 14) are locked by use (Continued)

of the controlling means. The invention further relates to a corresponding fluid conduction system.

15 Claims, 6 Drawing Sheets

(58) Field of Classification Search
USPC .......................................... 137/614.03–614.05
See application file for complete search history.

(56) References Cited

FOREIGN PATENT DOCUMENTS

| | | | |
|---|---|---|---|
| CN | 101649938 | A | 2/2010 |
| EP | 0633039 | A1 | 1/1995 |
| WO | 2010100435 | A1 | 9/2010 |
| WO | 2011100937 | A1 | 8/2011 |

\* cited by examiner

CONNECTOR FOR A FLUID CONDUCTION SYSTEM AND A FLUID CONDUCTION SYSTEM WITH A CORRESPONDING CONNECTOR

RELATED APPLICATIONS

This application is a 35 U.S.C. 371 national stage filing from International Application No. PCT/EP2015/081351, filed Dec. 29, 2015, the entire contents of which are incorporated herein by reference.

FIELD OF THE INVENTION

The invention relates to a connector for a fluid conduction system, especially for joining two conduits of such a system, the connector comprising: (a) a female coupling part; (b) a male coupling part for inserting into the female coupling part along a longitudinal axis of the connector; and (c) means for locking/unlocking the inserted male coupling part within the female coupling part by rotating said two coupling parts against one another about the longitudinal axis The invention further relates to a corresponding use of such a connector in a fluid conduction system.

BACKGROUND OF THE INVENTION

The above mentioned connector is known as a connector for joining two conduits in a fluid conduction system from document EP 0 633 039 A1. Said document shows a hose connector for joining two hoses of a system for medical purposes. The connector comprises a female coupling part; a male coupling part for inserting into the female coupling part along a longitudinal axis of the connector; and a bayonet lock for locking/unlocking the two coupling parts by rotating them against one another about the longitudinal axis after the insertion of the male coupling part into the female coupling part, wherein a fluid-tight connection of the coupling parts is improved by the rotating motion and a corresponding sealing.

These connectors are arranged for non-dangerous liquids or other fluids like gases or aerosols but not suitable for hazardous fluids like toxic fluids, caustic fluids or other harmful liquid chemicals.

Therefore, the one object underlying the present invention is to provide a save, cost-effective and easy to use connector.

SUMMARY OF THE INVENTION

This object is achieved by the invention as defined by the independent claim. The dependent claims detail advantageous embodiments of the invention.

According to several aspects of the invention, the means for locking/unlocking the coupling parts are controlling means for locking/unlocking the inserted male coupling part within the female coupling part and for controlling the fluidic coupling of the two coupling parts by rotating said two coupling parts against one another about the longitudinal axis. A portion of each of the coupling parts is realized as a shut-off valve with a valve body and a rotatable slider element, wherein the rotatable slider element of each shut-off valve is in a compulsory closed position when the two coupling parts are unlocked; and wherein the rotatable slider element of each shut-off valve is transferable between the closed position and an open position only if the two coupling parts are locked by use of the controlling means.

With respect to the present invention the term "fluid" comprises the physical states of aggregation liquid and gaseous. The main advantages of the connector according to the invention are safe, cost-effective and easy to use connector, which is suitable even for hazardous fluids.

There are two main ideas realized in the connector according to the invention:

(i) Each of the coupling parts comprises a separate shut-off valve for shutting off the corresponding coupling part when it is separated from the other one and (ii) The actuating mechanism for opening or closing these shut-off valves can only be activated when both coupling parts are locked with each other.

Accordingly the corresponding rotating movement is divided into two consecutively running sequences, namely a locking sequence for locking/unlocking the coupling parts and an actuating sequence for actuating the shut-off valves of both coupling parts. This actuating sequence is a fluidic coupling/decoupling sequence.

The movement for connecting the coupling parts starts with inserting the male coupling part into the female coupling part along the longitudinal axis, wherein the two coupling parts are unlocked but sealed against each other at the end of this sequence. Afterwards, the coupling parts are rotated against each other with respect to the longitudinal axis to lock the connectors and to open both shut-off valves in the locked state of the connectors.

The movement for separating the coupling parts starts with rotating the coupling parts against each other with respect to the longitudinal axis to uncouple the connector by closing the shut-off valves and to unlock the coupling parts. At the end of this sequence, the shut-off valves are closed, the male coupling part is lifted a little along the longitudinal axis in which the coupling parts are unlocked, but still connected and sealed. Afterwards, the male coupling part is extracted from the female coupling part by pulling it out along the longitudinal axis until finally the two coupling parts are separated from each other.

According to a preferred embodiment of the present invention, the controlling means are provided by a bayonet mount like structure formed by at least one bayonet pin at one of the two coupling parts and at least one curved bayonet groove arranged in the other of the coupling parts defining the combined insertion-rotation movement of the coupling parts against each other.

Preferably, the bayonet pin or bayonet pins are part of the male coupling part and the curved bayonet groove or bayonet grooves are arranged in the female coupling part.

According to another preferred embodiment of the present invention, the controlling means define a characteristic locking/unlocking angle $\alpha_1$.

Preferably, each of the rotatable slider elements has a characteristic rotation angle $\alpha_2$, $\alpha_3$ between the open position and the closed position, wherein a total rotating angle $\alpha$ of the rotating of the coupling parts against one another given by the controlling means is equal to the sum of said characteristic angles $\alpha_1$, $\alpha_2$, $\alpha_3$. In other words, by rotating the one of the coupling parts against the other coupling part by the complete rotating angle $\alpha$, the two valves are opening/closing in an order determined by internal friction forces between the valve bodies and the slider elements, but one thing is certain: at the respective end of the rotating angle $\alpha$ both valves are completely open or completely closed.

According to another preferred embodiment of the present invention, for each shut-off valve the rotatable slider element is arranged inside the valve body and formed as a sleeve with an opening in the respective sleeve wall, wherein this opening in the sleeve wall corresponds to an opening of the valve-body.

Especially, the shut-off valve of the male coupling part is arranged inside the shut-off valve of the female coupling part when both coupling parts are coupled, wherein both sleeve formed slider elements are arranged coaxially.

In this context, the openings in the sleeve-walls and the openings in the valve-bodies are arranged preferably in a radial oriented line with respect to the longitudinal axis of the connector. Alternatively the openings can be arranged axially.

According to another preferred embodiment of the present invention, the connector further comprises at least one sealing for sealing said coupling parts against each other, wherein the at least one sealing is arranged for sealing the inserted male coupling part against the female coupling part even in a coupled but unlocked state of the coupling parts.

Preferably, at least one of the coupling parts comprises a supporting structure for supporting the sealing for sealing said coupling part against the other coupling part.

According to yet another preferred embodiment of the present invention, a sequence of rotation movements for locking/unlocking the connector comprises a helically running guiding. By the use of this helically guiding a complete insertion in longitudinal direction while coupling is realized automatically. While uncoupling the helical guiding causes a defined longitudinal lifting of the male connector to overcome sticking effects in a well-defined manner.

In accordance with another aspect of the present invention, the two rotatable slider elements form a positive-lock driving structure with each other; and the valve body and the rotatable slider element of each one of the two shut-off valves form a positive-locking driving structure with each other.

According to another preferred embodiment of the present invention, the male coupling part further comprises a connecting branch for a conduit.

According to yet another preferred embodiment of the present invention, the female coupling part further comprises a conduit element encircling the valve body at a distance therefrom.

Several other aspects of the present invention refer to a fluid conduction system comprising a connector, the system being designed as one of the following systems:
 (i) an apparatus for emptying a canister or another fluid container, the apparatus further comprising a suction lance; and
 (ii) a hose and/or pipe system further comprising hoses and/or pipes joint by the connector;
wherein the connector is an aforementioned connector. In other words, these aspects of the present invention relate to the use of the connector within a fluid conduction system.

According to a preferred embodiment of the present invention, the apparatus for emptying a canister or another fluid container further comprising a union nut for fixing the female coupling part and the suction lance at the fluid container.

DETAILED DESCRIPTION OF THE INVENTION

Additional details, features, characteristics and advantages of the object of the invention are disclosed in the figures and the following description of the respective figures, which—in exemplary fashion—show one embodiment and an example of a dispensing system according to the invention. In the drawings.

Figure 1:
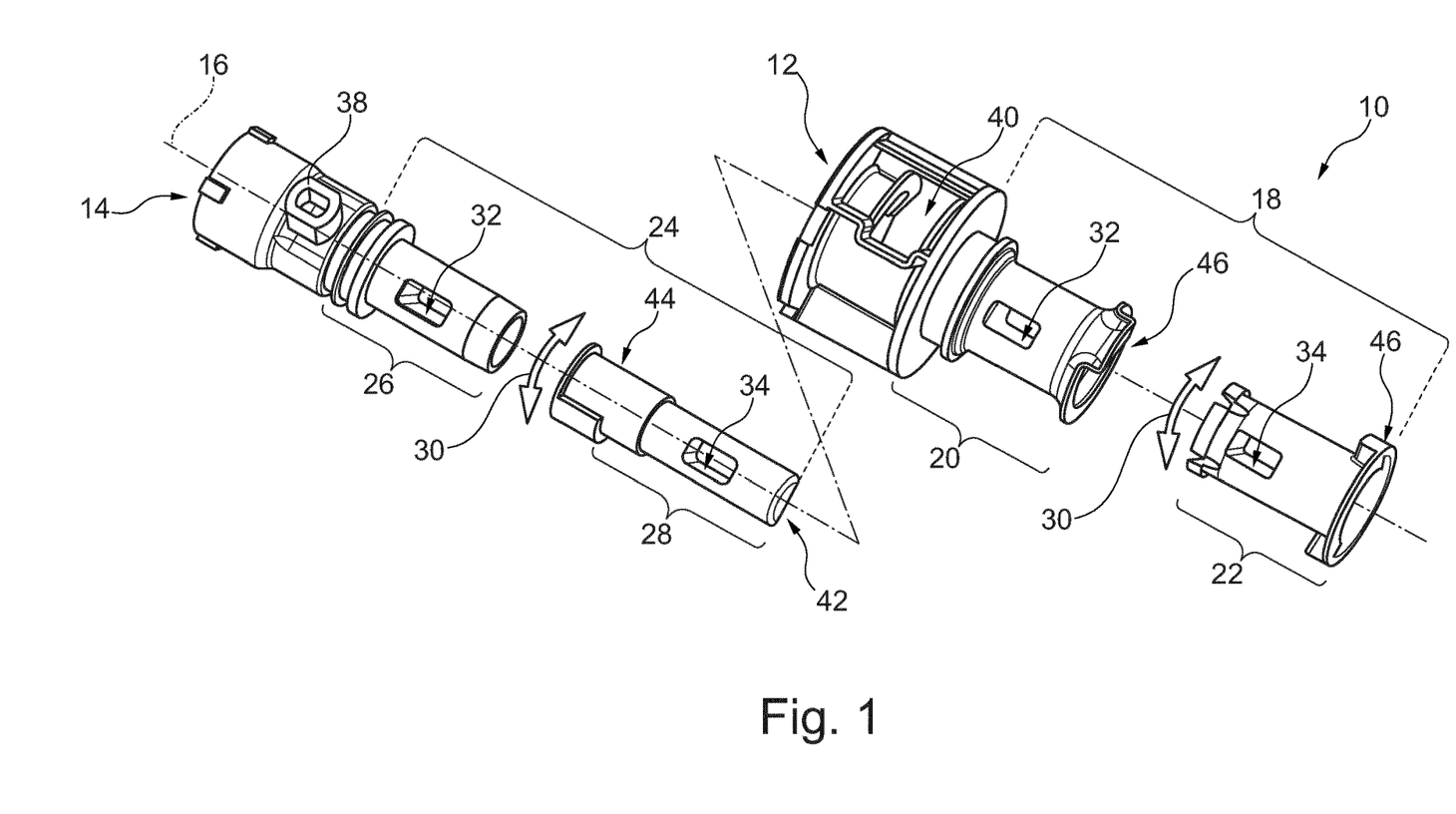
FIG. 1 shows the main components of a connector according to a first preferred embodiment of the present invention.

FIG. 1 shows the main components of a connector 10 for a fluid conduction system. The connector 10 comprises a female coupling part 12 and a male coupling part 14. The male coupling part 14 is arranged for inserting into the female coupling part 12 along a longitudinal axis 16 of the connector 10. A longitudinal portion of the female coupling part 12 is realized as a shut-off valve 18 with a valve body 20 and a rotatable slider element 22 and a longitudinal portion of the male coupling part 14 is realized as another shut-off valve 24 with a valve body 26 and a slider element 28 rotatable with respect to the corresponding valve body (double arrows 30). When both coupling parts 12, 14 are coupled, the shut-off valve 24 of the male coupling part 14 is arranged coaxially inside the shut-off valve 18 of the female coupling part 12. Both rotatable slider elements 22, 28 are formed as sleeves. Two slot-shaped breakthroughs (openings) 32; 34 are formed in the walls of each of the slider elements 22, 28 and in the walls of each of the valve bodies 20, 26 leading to two fluid paths from the inside of the slider element 28 of the male coupling part 14 to the outside of the valve body 20 of the female coupling part 12 if the shut-off valves 18, 24 are both in the open-position. The fluid paths are both directed radially with respect to the longitudinal axis 16 propagating in opposite directions.

Figure 2:
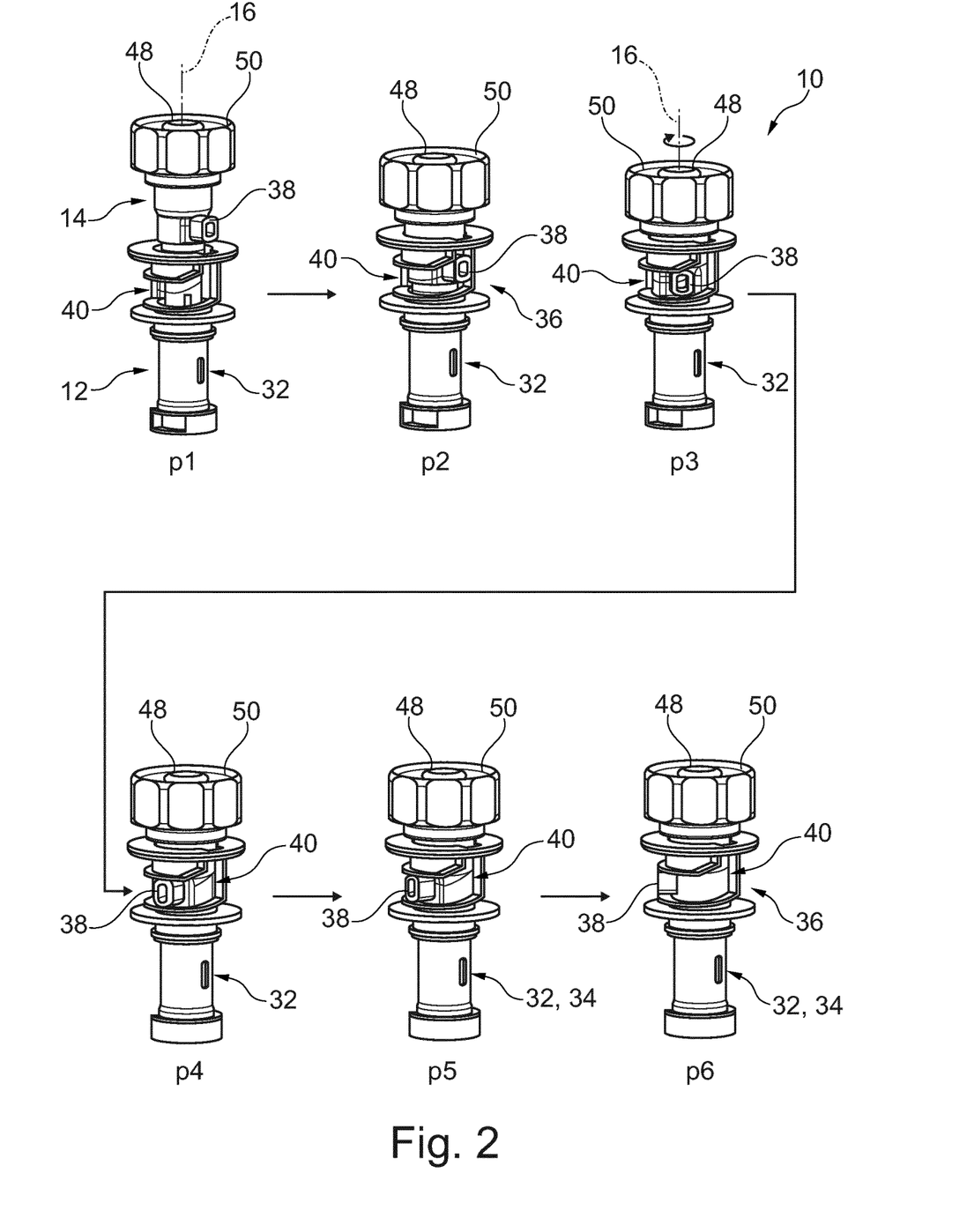
FIG. 2 shows the coupling of the two coupling parts of the connector in six phases.

The connector 10 further comprises a bayonet mount structure 36 (the mounted structure is shown in FIG. 2, e.g. phase p6) for coupling the two coupling parts 12, 14 by rotating them against one another about the longitudinal axis 16 after the insertion of the male coupling part 14 into the female coupling part 12. The bayonet mount structure 36 is formed by a bayonet pin 38 at the male coupling member 14 and a curved bayonet groove 40 arranged in female coupling member 12. The bayonet mount structure 36 specifies a combined insertion, lift and rotation movement of the coupling parts 12, 14 against each other when coupling them.

The two rotatable slider elements 22, 28 form a positive-lock driving structure 42 with each other at one end of the coupler 10, wherein in FIG. 1 only one part of said structure 42 is visible at the outside of slider element 28. The counter part of the structure 42 is located inside the other slider element 22. Further on, the valve body 26 and the rotatable slider element 28 of the shut-off valve 24 form another positive-locking driving structure 44 with each other, wherein in FIG. 1 only one part of said structure 44 is visible at the outside of slider element 28. The counter part of the structure 44 is located inside the valve body 26. Finally, the valve body 20 and the rotatable slider element 22 of the shut-off valve 18 form yet another positive-locking driving structure 46 with each other, wherein one part of said structure 46 is located at one end of the slider element 22 and the counter part of the structure 46 is located at the corresponding end of the valve body 20. At least one of the driving structures 42, 44, 46 has a desired backlash.

FIG. 2 shows the coupling of the male and female coupling parts 14, 12 of the connector 10 in six phases p1-p6. The male coupling part 14 comprises a connecting branch 48 and a handle 50 surrounding said connecting branch 48. The six phases p1-p6 are given by the way of the bayonet pin 38 along a path given by the curved bayonet groove 40. The bayonet groove 40 has an essentially L-shaped contour. Starting with separated coupling parts 12, 14 in the first phase p1, the male coupling part 14 is inserted into the female coupling part 12 along the longitudinal axis 16 up to the position of phase p2. At these two first phases p1, p2, the rotatable slider element 26, 28 of each of the shut-off valves 18, 20 is in a closed position. The female and male coupling parts 12, 14 are sealed with each other. At the third phase p3, the longitudinal inserting movement is turned to a circumferential rotating movement (superimposed rotation and draw-in movement) by means of a helically running intermediate part of the bayonet groove 40. Starting with the rotating movement at the third phase p3, the coupling parts 12, 14 are first rotated against each other by a characteristic locking/unlocking angle $\alpha 1$ with respect to the longitudinal axis to lock the connectors 12, 14. and to open the shut-off valves at the same time in the locked state of the connectors. By further turning, the shut-off valves 18, 24 are opening successive or in parallel driven by the torque transferred via the elements 50, 24, 44, 28, 42. Each of the rotatable slider elements 22, 28 has a characteristic rotation angle $\alpha_2$, $\alpha_3$ between the open position and the closed position, wherein a rotating angle $\alpha$ of the rotating of the coupling parts 12, 14 against one another given by the bayonet mount structure 36 is equal to the sum of said characteristic angles $\alpha_1$, $\alpha_2$, $\alpha_3$. Preferably, the rotating angle $\alpha$ is an angle about 170°. At this decoupling process, the shut-off valves 18, 24 will close first, followed by the unlocking procedure.

In this context, it is essential that (a) the rotatable slider element 22, 28 of each shut-off valve 18, 24 is transferable between the open position and the closed position by means of the rotating of the one coupling part 14, 12 with respect to the other coupling part 12, 14 by means of the bayonet mount structure 36 only if the two coupling parts 12, 14 are locked and (b) that the rotatable slider element 22, 28 of each shut-off valve 18, 24 is in a closed position when the two coupling parts 12, 14 are unlocked or even separated from one another.

Figure 3:
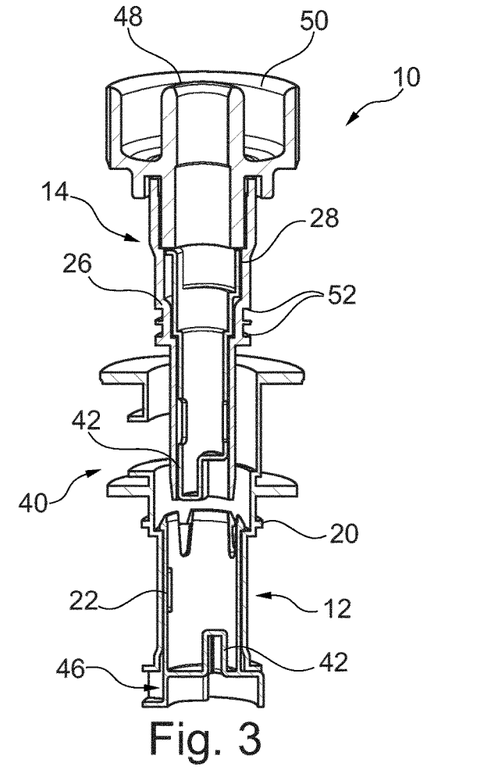
FIG. 3 shows the connector in a sectional representation during the first phase of FIG. 2.

FIG. 3 shows the connector 10 in a sectional representation during the first phase p1 of FIG. 2. At this position, the male coupling part 14 clearly shows two grooves 52 for holding two (o-ring) sealings (not shown) for sealing said coupling part 14 against the other coupling part 12. Due to the sectional representation the complete positive-locking driving structure 42 formed by the two rotatable slider elements 22, 28 is visible in FIGS. 3 to 5 and 7.

Figure 4:
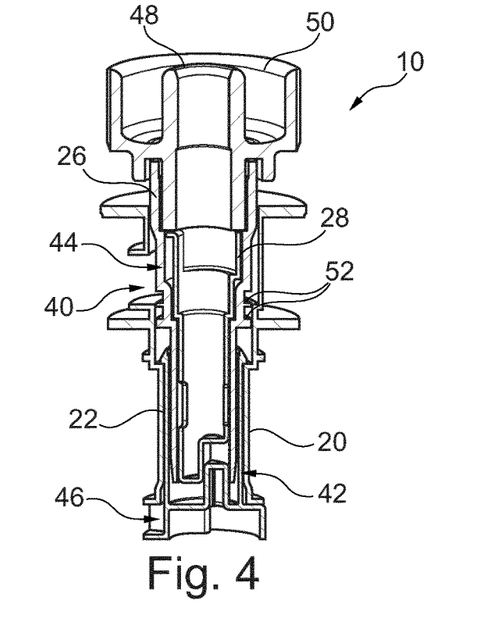
FIG. 4 shows the connector in a sectional representation during the second phase of FIG. 2.

FIG. 4 shows the connector 10 in a sectional representation during the second phase p2 of FIG. 2. The male coupling part 14 is partly inserted into the female coupling part 12. Like in the first phase p1, the two shut-off valves 18, 24 are closed.

Figure 5:
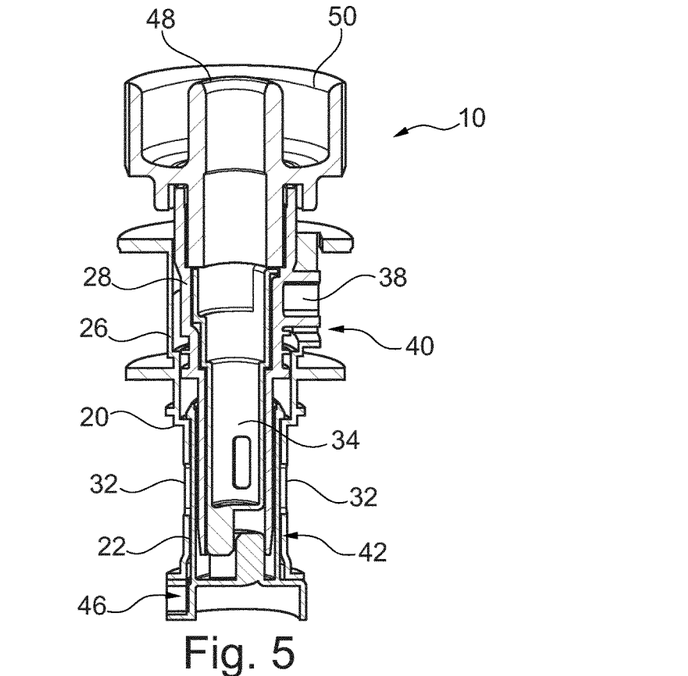
FIG. 5 shows the connector in a sectional representation during the second phase of FIG. 2, with a cut surface transverse to the cut surface of FIG. 4.

FIG. 5 shows the connector 10 in a sectional representation during the second phase p2 of FIG. 2, with a cut surface transverse to the cut surface of FIG. 4 through the breakthroughs 32 of the valve body 20.

Figure 6:
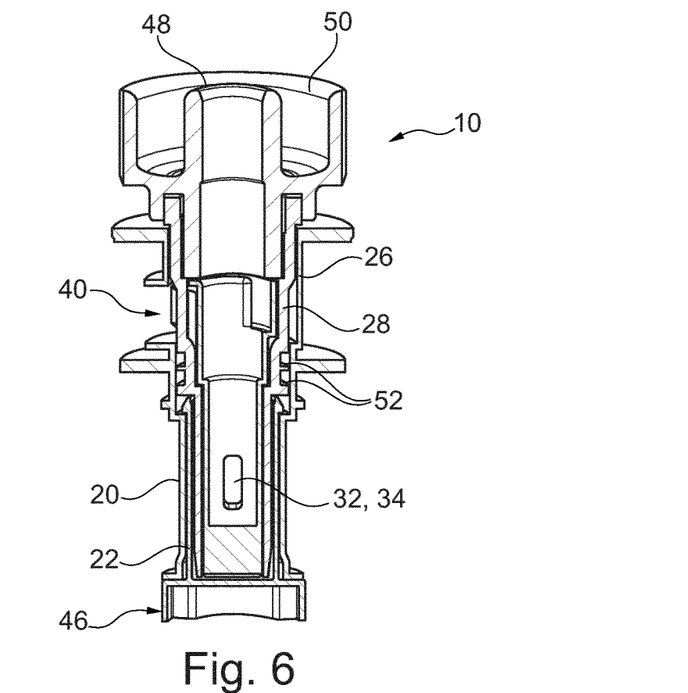
FIG. 6 shows the connector in a sectional representation during the sixth phase of FIG. 2 maintaining the cut surface of FIG. 4 with respect to the female coupling part.

FIG. 6 shows the connector 10 with the cut surface of FIG. 4 with respect to the female coupling part 12. In this position the two coupling parts 12, 14 are coupled and the rotatable slider element 22, 28 of each of the shut-off valves 18, 24 is still in the closed position.

Figure 7:
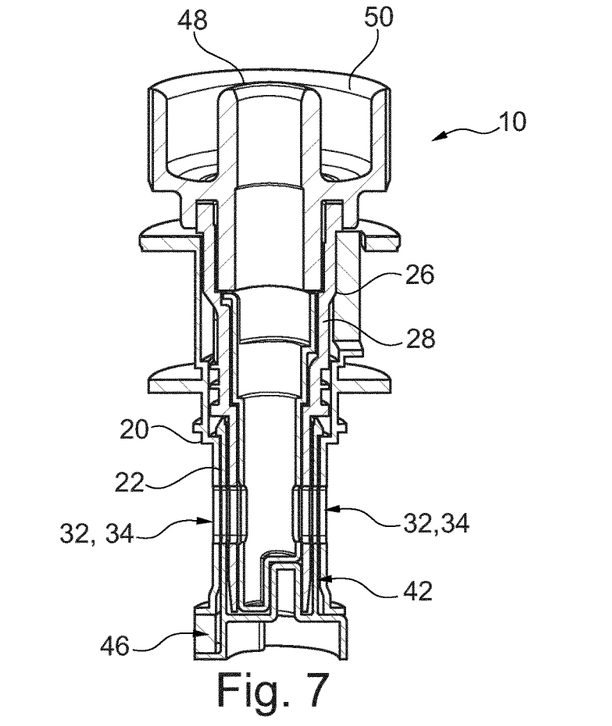
FIG. 7 shows the connector in a sectional representation during the sixth phase of FIG. 2, with the cut surface perpendicular to the cut surface of FIG. 6.

FIG. 7 shows the connector 10 in a sectional representation during the sixth phase p6 of FIG. 2 maintaining the cut surface of FIG. 6. In this position the two coupling parts 12, 14 are coupled and the rotatable slider element 22, 28 of each of the shut-off valves 18, 24 is in the open position with all breakthroughs 32, 34 being in line to form a radial oriented fluid path between the inside and the outside of the connector 10. In this figure both fluid paths build by the breakthroughs 32, 34 are visible aligned/open.

Figure 8:
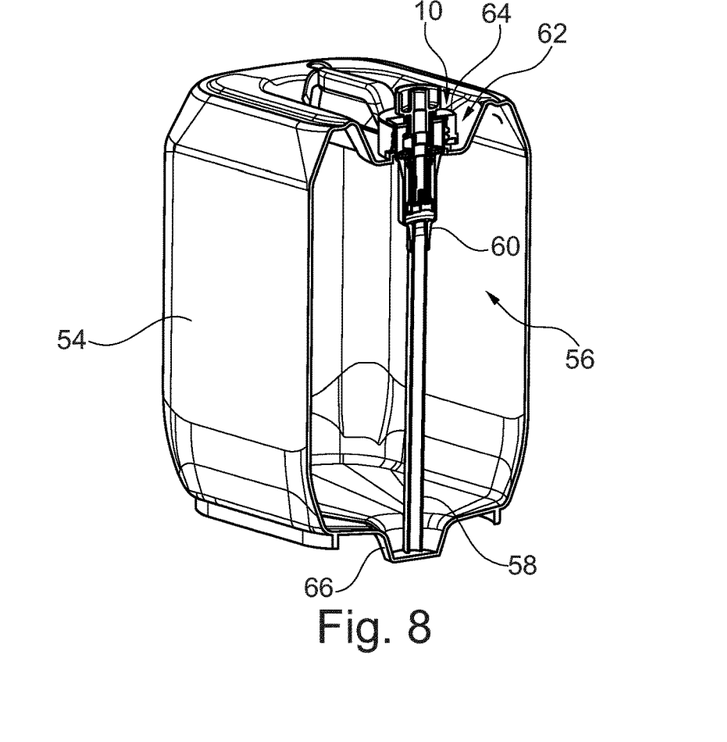
FIG. 8 shows a canister and an apparatus for emptying said canister in a sectional representation, wherein the apparatus comprises the connector and is mounted in the canister.

FIG. 8 shows a canister 54 and an apparatus 56 for emptying said canister 54 in a sectional representation. The apparatus 56 for emptying the canister 54 is mounted in the canister 54 and comprises the connector 10 and a suction lance 58 with a conduit element 60. The suction lance 58 is fluidicly coupled to the female coupling part 12 of the connector 10 by means of said conduit element 60, wherein the conduit element 60 encircles the valve body 20 fluid-sealed. The connector 10 is located at a filler 62 of the canister 54 and is fixed by use of a union nut 64. The suction lance 58 reaches from the connector 10 down to a reservoir structure 66 at the bottom of the canister 54.

Figure 9:
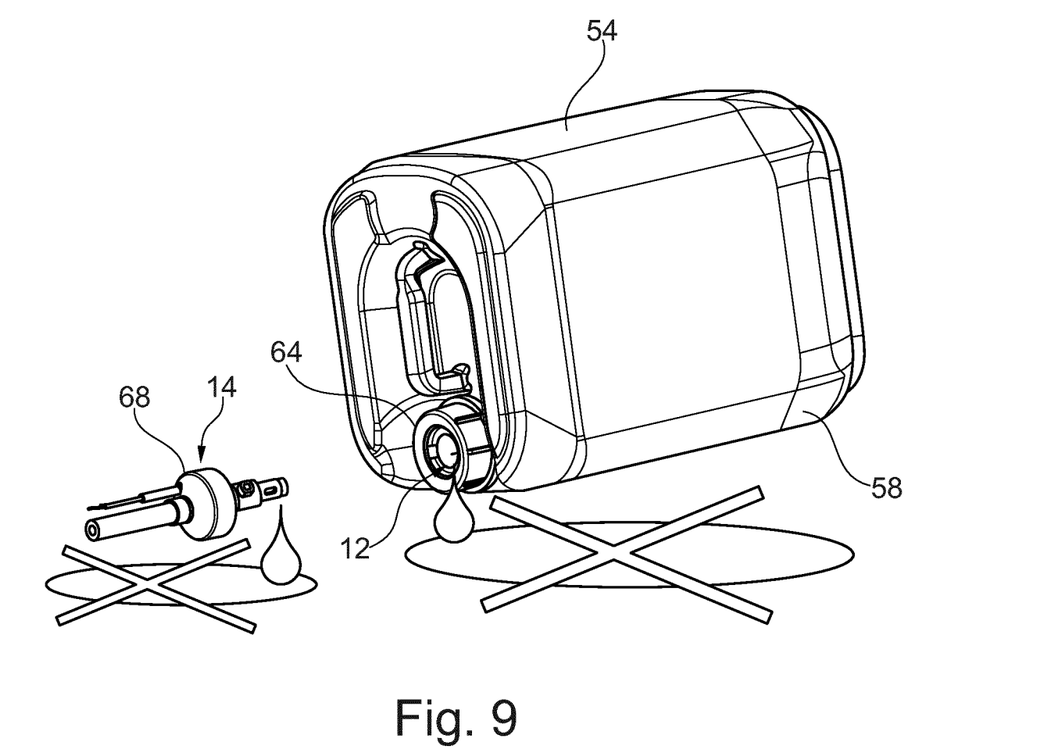
FIG. 9 shows the canister and the apparatus for emptying the canister with the male coupling part decoupled from the female coupling part.

Finally, FIG. 9 shows the canister 54 and the apparatus 56 for emptying the canister with the male coupling part 14 decoupled from the female coupling part 12 still fixed to the filler 62 of the canister 54 by use of the union nut 64. The male coupling part 14 of the connector 10 shown in this example further comprises a fluid sensor 68 used as an empty alarm sensor for the canister 54.

FIG. 9 illustrates one of the main features of the invention, namely that the connector 10 and the apparatus 56 respectively are always fluid tight on the side of each of the coupling parts 12, 14 when they are decoupled. In other words, all drip and leak problems connected with an exchange of the canister 54 are solved, because the coupling parts 12, 14 are always leak-proved and therefore safe when decoupled/disconnected.

The following advantages will result from the use of this connector 10: increased safety during transport, operation and disposal; easy handling due to the bayonet coupling; high reliability due to the use of common valve technology; cost efficiency due to use of low cost package valves; modularity with lock out and sensor options; universal applicability; and refill protection, because there is no possibility to use competitor liquids.

It should be noted that, as used in this specification and the appended claims, the singular forms "a", "an" and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

What is claimed is:

1. A connector for a fluid conduction system comprising:
   a female coupling part;

a male coupling part for inserting into the female coupling part along a longitudinal axis of the connector; and a coupling parts lock for locking/unlocking an inserted male coupling part within the female coupling part and for controlling a fluidic coupling of the two coupling parts by rotating at least one of the two coupling parts relative to the other coupling part about the longitudinal axis;

wherein a portion of each of the coupling parts is realized as a shut-off valve with a valve body and a rotatable slider element, the rotatable slider element of each shut-off valve being rotatable relative to the valve body associated with the shut-off valve and rotating relative to the valve body associated with the shut-off valve when the at least one of the coupling parts rotates relative to the other coupling part;

wherein the rotatable slider element of each shut-off valve is in a compulsory closed position when the two coupling parts are unlocked; and wherein the rotatable slider element of each shut-off valve is transferable between a closed position and an open position when the two coupling parts are locked.

2. The connector according to claim 1, wherein the coupling parts lock is provided by a bayonet mount structure formed by at least one bayonet pin at one of the two coupling parts and at least one curved bayonet groove arranged in the other of the coupling parts, the bayonet mount structure defining a combined insertion-rotation movement of the two coupling parts against each other.

3. The connector according to claim 1, wherein the coupling parts lock defines a characteristic locking/unlocking angle $\alpha_1$.

4. The connector according to claim 3, wherein each of the rotatable slider elements has a characteristic rotation angle $\alpha_2$, $\alpha_3$ between the open position and the closed position, wherein a total rotating angle $\alpha$ of the rotating of the two coupling parts against one another given by the coupling parts lock is equal to a sum of the characteristic angles $\alpha_1$, $\alpha_2$, $\alpha_3$.

5. The connector according to claim 1, wherein for each shut-off valve the rotatable slider element is arranged inside the valve body and formed as a sleeve with a breakthrough in the respective sleeve wall, wherein the breakthrough in the sleeve wall corresponds to the breakthrough in the valve body.

6. The connector according to claim 5, wherein the shut-off valve of the male coupling part is arranged inside the shut-off valve of the female coupling part when the two coupling parts are coupled together, wherein both sleeve formed rotatable slider elements are arranged coaxially.

7. The connector according to claim 6, wherein the breakthrough in each sleeve wall and the breakthrough in each valve body are arranged in a radial oriented line with respect to the longitudinal axis of the connector.

8. The connector according to claim 1, further comprising at least one sealing for sealing the two coupling parts against each other, wherein the at least one sealing is arranged for sealing the inserted male coupling part against the female coupling part even in an unlocked state of the two coupling parts.

9. The connector according to claim 1, wherein a sequence of movements for connecting/disconnecting the connector further comprises a helically running intermediate part, which is a transition part from inserting movement to a rotating movement, of the bayonet groove.

10. The connector according to claim 9, wherein the helically running intermediate part:
while connecting ensures that the two coupling parts are completely inserted and
while disconnecting causes a lifting of the male coupling part in the longitudinal axis to overcome sticking effects between the two coupling parts.

11. The connector according to claim 1, wherein
the two rotatable slider elements form a positive-lock driving structure with each other and
the valve body and the rotatable slider element of each one of the two shut-off valves form a positive-locking driving structure with each other.

12. The connector according to claim 1, wherein the male coupling part further comprises a connecting branch for a conduit.

13. The connector according to claim 1, wherein the female coupling part further comprises a conduit element encircling the valve body at a distance therefrom.

14. The connector according to claim 1, further comprising a fluid sensor.

15. A fluid conduction system comprising the connector according to claim 1, the system being designed as
an apparatus for emptying a canister or another fluid container, the apparatus further comprising a suction lance.

* * * * *